US012806686B2

(12) United States Patent
Brumm et al.

(10) Patent No.: US 12,806,686 B2
(45) **Date of Patent: *Nov. 24, 2026**

(54) POWDERS BASED ON NIOBIUM-TIN COMPOUNDS FOR MANUFACTURING SUPERCONDUCTING COMPONENTS

(71) Applicant: TANIOBIS GMBH, Goslar (DE)

(72) Inventors: Holger Brumm, Goslar (DE); Helmut Haas, Boerssum (DE); Christoph Schnitter, Holle (DE)

(73) Assignee: TANIOBIS GMBH, Goslar (DE)

( * ) Notice: Subject to any disclaimer, the term of this patent is extended or adjusted under 35 U.S.C. 154(b) by 1176 days.

This patent is subject to a terminal disclaimer.

(21) Appl. No.: 17/427,918

(22) PCT Filed: Feb. 5, 2020

(86) PCT No.: PCT/EP2020/052826

§ 371 (c)(1),
(2) Date: Aug. 3, 2021

(87) PCT Pub. No.: WO2020/161170

PCT Pub. Date: Aug. 13, 2020

(65) Prior Publication Data

US 2022/0118515 A1 Apr. 21, 2022

(30) Foreign Application Priority Data

Feb. 8, 2019 (DE) ..................... 10 2019 000 905.3

(51) Int. Cl.

| | |
|---|---|
| ***B22F 9/16*** | (2006.01) |
| ***B22F 1/05*** | (2022.01) |
| ***B22F 1/145*** | (2022.01) |
| ***B22F 1/148*** | (2022.01) |
| ***B22F 9/22*** | (2006.01) |
| ***B33Y 10/00*** | (2015.01) |
| ***B33Y 70/00*** | (2020.01) |
| ***C22C 13/00*** | (2006.01) |
| ***C22C 27/02*** | (2006.01) |
| *B22F 1/065* | (2022.01) |
| *B22F 10/28* | (2021.01) |
| *B23K 15/00* | (2006.01) |
| *B23K 26/342* | (2014.01) |
| *B23K 103/08* | (2006.01) |

(52) U.S. Cl.

CPC .................. *B22F 9/22* (2013.01); *B22F 1/05* (2022.01); *B22F 1/145* (2022.01); *B22F 1/148* (2022.01); *B22F 9/16* (2013.01); *B33Y 10/00* (2014.12); *B33Y 70/00* (2014.12); *C22C 13/00* (2013.01); *C22C 27/02* (2013.01); *B22F 1/065* (2022.01); *B22F 10/28* (2021.01); *B22F 2301/30* (2013.01); *B22F 2304/10* (2013.01); *B23K 15/0086* (2013.01); *B23K 26/342* (2015.10); *B23K 2103/08* (2018.08)

(58) Field of Classification Search

CPC .... B22F 3/20; B22F 1/148; B22F 9/16; B22F 1/05; B22F 9/04; B22F 9/22; B22F 1/145; B22F 10/20; B22F 1/065; B22F 9/082; B22F 2304/10; B22F 10/28; B22F 2301/30; B22F 2998/10; B22F 2999/00; B22F 5/12; B22F 10/34; B22F 2304/058; B22F 10/73; B22F 10/25; B22F 2301/20; C22C 1/047; C22C 27/02; C22C 1/0483; C22C 1/045; C22C 13/00; C22C 21/08; C22C 21/04; C22C 21/10; B33Y 70/00; B33Y 10/00; Y02E 40/60; B23K 26/342; B23K 2103/08; B23K 15/0086; Y02P 10/25

USPC .... 219/76.1–77, 149–154, 635–646; 29/599; 148/98; 174/125.1; 257/39.006, 39.017; 419/8, 23, 38, 66; 428/555; 505/510, 505/813–815, 822, 823, 921

See application file for complete search history.

(56) References Cited

U.S. PATENT DOCUMENTS

| | | | | |
|---|---|---|---|---|
| 4,465,511 | A * | 8/1984 | Sale | H10N 60/85 420/490 |
| 4,687,883 | A * | 8/1987 | Flukiger | H10N 60/0184 29/599 |
| 4,776,899 | A * | 10/1988 | Murase | H10N 60/0184 29/599 |
| 7,459,030 | B2 * | 12/2008 | Miyazaki | B22F 7/04 29/599 |
| 7,459,031 | B2 * | 12/2008 | Miyazaki | B22F 5/12 419/34 |
| 11,993,829 | B2 * | 5/2024 | Brumm | C22C 1/045 |

(Continued)

FOREIGN PATENT DOCUMENTS

| | | |
|---|---|---|
| CN | 103071794 A | 5/2013 |
| DE | 35 31 769 A1 | 3/1987 |

(Continued)

OTHER PUBLICATIONS

R. O. Suzuki et al.: “Processes to produce superconducting $Nb_3Sn$ powders from Nb—Sn oxide”, Journal of Materials Science, vol. 22, No. 6, pp. 1999-2005 (1987).
T. Satish Kumar et al.: “Preparation of Niobium Metal Powder by Two-Stage Magnesium Vapor Reduction of Niobium Pentoxide”, Journal of Metallurgy, vol. 2013, pp. 1-6 (2013).
T. Wong et al.: “Ti and Ta Additions to $Nb_3Sn$ by the Powder in Tube Process”, IEEE Transactions on Applied Superconductivity, vol. 11, No. 1, pp. 3584-3587, (2001).

(Continued)

*Primary Examiner* — Hung D Nguyen
(74) *Attorney, Agent, or Firm* — Norman B. Thot

(57) ABSTRACT

A powder for producing a superconducting component. The powder includes $Nb_xSn_y$, where $1 \leq x \leq 6$ and $1 \leq y \leq 5$. The powder does not have any separate NbO phases and/or SnO phases.

17 Claims, 4 Drawing Sheets

(56) References Cited

U.S. PATENT DOCUMENTS

| | | | | |
|---|---|---|---|---|
| 2002/0179184 | A1* | 12/2002 | Rudziak | B22F 5/12 148/98 |
| 2006/0216191 | A1* | 9/2006 | Miyazaki | H10N 60/0184 419/8 |
| 2008/0092992 | A1* | 4/2008 | Miyazaki | C22C 1/047 148/98 |
| 2010/0031493 | A1* | 2/2010 | Motowidlo | H01B 12/10 29/599 |
| 2010/0255998 | A1* | 10/2010 | Buta | C22C 1/00 427/196 |
| 2014/0287929 | A1* | 9/2014 | Thoener | B22F 5/12 29/599 |
| 2017/0062099 | A1* | 3/2017 | Xu | C22F 1/18 |
| 2018/0211747 | A1* | 7/2018 | Schlenga | H10N 60/0156 |
| 2022/0118515 | A1* | 4/2022 | Brumm | B22F 1/145 |

FOREIGN PATENT DOCUMENTS

| | | | |
|---|---|---|---|
| EP | 0 048 313 | A1 | 3/1982 |
| EP | 0 140 356 | A2 | 5/1985 |
| JP | 2018-150618 | A | 9/2018 |
| WO | WO 00/67936 | A1 | 11/2000 |

OTHER PUBLICATIONS

A. Godeke et al.: "State of the art powder-in-tube niobium-tin superconductors", Cryogenics, vol. 48, pp. 308-316 (2008).

M. López et al.: "Synthesis of nano intermetallic $Nb_3Sn$ by mechanical alloying and annealing at low temperature", Journal of Alloys and Compounds, vol. 612, pp. 215-220 (2014).

ASTM International Standard Test Method for Surface Area of Catalysts and Catalyst Carriers, Designation: D 3663-03, pp. 1-5 (2003).

* cited by examiner

POWDERS BASED ON NIOBIUM-TIN COMPOUNDS FOR MANUFACTURING SUPERCONDUCTING COMPONENTS

CROSS REFERENCE TO PRIOR APPLICATIONS

This application is a U.S. National Phase application under 35 U.S.C. § 371 of International Application No. PCT/EP2020/052826, filed on Feb. 5, 2020 and which claims benefit to German Patent Application No. 10 2019 000 905.3, filed on Feb. 8, 2019. The International Application was published in German on Aug. 13, 2020 as WO 2020/161170 A1 under PCT Article 21 (2).

FIELD

The present invention relates to powders based on niobium-tin compounds, in particular of the composition $Nb_xSn_y$, where 1≤x≤6 and 1≤y≤5, for the production of superconducting components, wherein the powders have a low oxygen content, a process for the production thereof and also the use of such powders for the production of superconducting components.

BACKGROUND

Superconductors are materials whose electrical resistance drops to zero when the temperature goes below a particular temperature, which is known as the critical temperature. In the superconducting state, the interior of the material remains free of electric and magnetic fields, and the electric current is transported without any losses. Superconductors are used, for example, to produce strong, constant magnetic fields or to produce low-loss transformers which for the same power have smaller dimensions and mass than conventional transformers and thus have advantages, especially in mobile operation.

Superconductors can be classified into various categories such as metallic superconductors, ceramic superconductors, and high-temperature superconductors. Since, at the latest, the discovery of the critical temperature of niobium-tin ($Nb_3Sn$) of 18.05 K, niobium and its alloys have moved into focus as materials for the production of superconductors. Superconducting cavity resonators made of niobium are thus used, for example, in particle accelerators (including XFEL and FLASH at the DESY in Hamburg or CERN in Geneva).

Superconducting wires are of particular interest as superconducting components, and these are used, for example, to produce superconducting coils. Kilometer-long wires having conducting fibers/filaments having a thickness of only a few microns are generally necessary for strong superconducting coils, and these require a complicated production processes.

For the production of such wires, in particular on the basis of niobium-tin alloys, recourse is generally made to the bronze process in which a Cu—Sn alloy is used as a starting material.

EP 0 048 313 thus describes superconducting wires based on bronze-$Nb_3Sn$ which can be employed at high magnetic fields and are characterized by a cubic phase in the bronze-$Nb_3Sn$ wire and comprise stabilizing alloy constituents from the group Li Be Mg Sc Y U Ti Zr Hf V Ta Mo Re Fe Ru Ni Pd Zn Al Ga In Tl Si Ge Sb in the wt. % range of from 0.01 to 7, based on the proportion of Nb, and/or from 0.05 to 10, based on the proportion of bronze in the wire, which largely prevent formation of a tetragonal phase and/or reduce tetragonal deformation (1−c/a).

As an alternative, superconducting wires based on niobium-tin alloys can be produced by the PIT (powder-in-tube) process in which a pulverulent tin-containing starting compound is introduced into a niobium tube and is then drawn to provide a wire. In a last step, a superconducting $Nb_3Sn$ boundary layer is formed between the niobium-containing sheathing tube and the tin-containing powder introduced via a heat treatment. The phase composition, chemical purity and particle size of the tin-containing starting compound, which must be no greater than the diameter of the finished filament, are thereby critical.

T. Wong et al. describe, for example, the PIT process and the production of the tin-containing starting compound for the example of $NbSn_2$ (T. Wong et al., "Ti and Ta Additions to $Nb_3Sn$ by the Powder in Tube Process", *IEEE Transactions on Applied superconductivity*, Vol. 11, No. 1 (2001), 3584-3587). A disadvantage of the process is that a multistage process made up of milling steps and thermal treatments of up to 48 hours is necessary for a satisfactory reaction of niobium with tin to form $NbSn_2$. The general teaching is furthermore that the oxygen content should be very low.

U.S. Pat. No. 7,459,030 describes a production process for a superconducting $Nb_3Sn$ wire by the PIT process in which a tantalum-tin alloy powder is used as a starting compound. To produce this, use is made of $K_2NbF_7$ and $K_2TaF_7$, which are reduced to the respective niobium metal and tantalum metal before the reaction with tin. The process described has the disadvantages, however, of some restrictions to the use of these niobium and tantalum metals. Only metals having a maximum content of oxygen of less than 3000 ppm and hydrogen of less than 100 ppm can thus be used. Exceeding the oxygen content leads to a lower quality of the finished wire. At hydrogen contents above 100 ppm, safety problems occur in the process, since the hydrogen escapes during the thermal treatment. The process described furthermore has the disadvantages that the target compounds contain a high content of unreacted tin and the finished wire core also contains tantalum-containing compounds, which can have an adverse effect on the superconducting properties of the wires. Sparingly soluble metal fluorides such as $MgF_2$ or $CaF_2$ are furthermore formed in the reduction of the starting compounds $K_2NbF_7$ and $K_2TaF_7$, and these cannot be separated off completely. All fluorine-containing compounds in the process chain are additionally very toxic.

A. Godeke et al. provide an overview of the conventional PIT processes for the production of niobium-tin superconductors (A. Godeke et al., "State of the art powder-in-tube niobium-tin superconductors", *Cyrogenics* 48 (2008), 308-3016).

M. Lopez et al. describe the synthesis of nano-intermetallic $Nb_3Sn$ by mechanical alloying and heat treatment at low temperatures (M. Lopez et al., "Synthesis of nano intermetallic $Nb_3Sn$ by mechanical alloying and annealing at low temperature", *Journal of Alloys and Compounds* 612 (2014), 215-220). The $Nb_3Sn$ thereby produced has a proportion of 87% by weight of $Nb_3Sn$ and 8% by weight of NbO.

All processes described in the prior art for producing superconducting wires composed of $Nb_3Sn$ have the disadvantage, however, that a significant proportion of oxygen is carried over to the target compounds via the introduction of oxygen with the elements niobium and tin and also while carrying out the process, for example, by means of air. The process described in U.S. Pat. No. 7,459,030, for example, is therefore restricted to the use of niobium and tantalum metal powders having an oxygen content of not more than 3000 ppm and tin having an oxygen content of not more than 2000 ppm. A high proportion of oxygen in the target compound can lead, for example, to occupation of the interstitial lattice sites by oxygen atoms and also to formation of a separate NbO phase, which can be detected by X-ray diffraction analyses. The niobium bound in this way is thus no longer available for further reactions, such as the formation of the $Nb_3Sn$ boundary layer. The solid-state diffusion of tin and niobium which is necessary for the formation of the boundary layer is additionally hindered. This not only has an adverse effect on the yield and efficiency of the production process, but the presence of oxygen can also lead to a significant impairment of the superconducting properties, for example, the critical current density or the residual resistance ratio (RRR), of the target compound and of the wire.

SUMMARY

An aspect of the present invention is to provide suitable starting compounds for the production of superconducting components, in particular superconducting wires, which starting compounds allow for an efficient reaction without impairing the superconducting properties of the target compounds.

In an embodiment, the present invention provides a powder for producing a superconducting component. The powder includes $Nb_xSn_y$, where 1≤x≤6 and 1≤y≤5. The powder does not comprise any separate NbO phases and/or SnO phases.

BRIEF DESCRIPTION OF THE DRAWINGS

The present invention is described in greater detail below on the basis of embodiments and of the drawings in which.

DETAILED DESCRIPTION

The present invention therefore firstly provides a powder for producing superconducting components, the powder comprising $Nb_xSn_y$, where 1≤x≤6 and 1≤y≤5, wherein the powder does not have any separate NbO and/or SnO phases. This can in particular be seen in that the powders do not, for example, have any NbO and/or SnO reflections in the X-ray diffraction pattern, as determined on pulverulent samples using an instrument from Malvern PANalytical (X'Pert-MPD with semiconductor detector, X-ray tubes Cu LFF with 40 KV/40 mA, Ni filter).

In an embodiment, the $Nb_xSn_y$ compound can, for example, be a compound which is selected from the group consisting of $Nb_3Sn$, $Nb_6Sn_5$, $NbSn_2$, and mixtures thereof.

Figure 1:
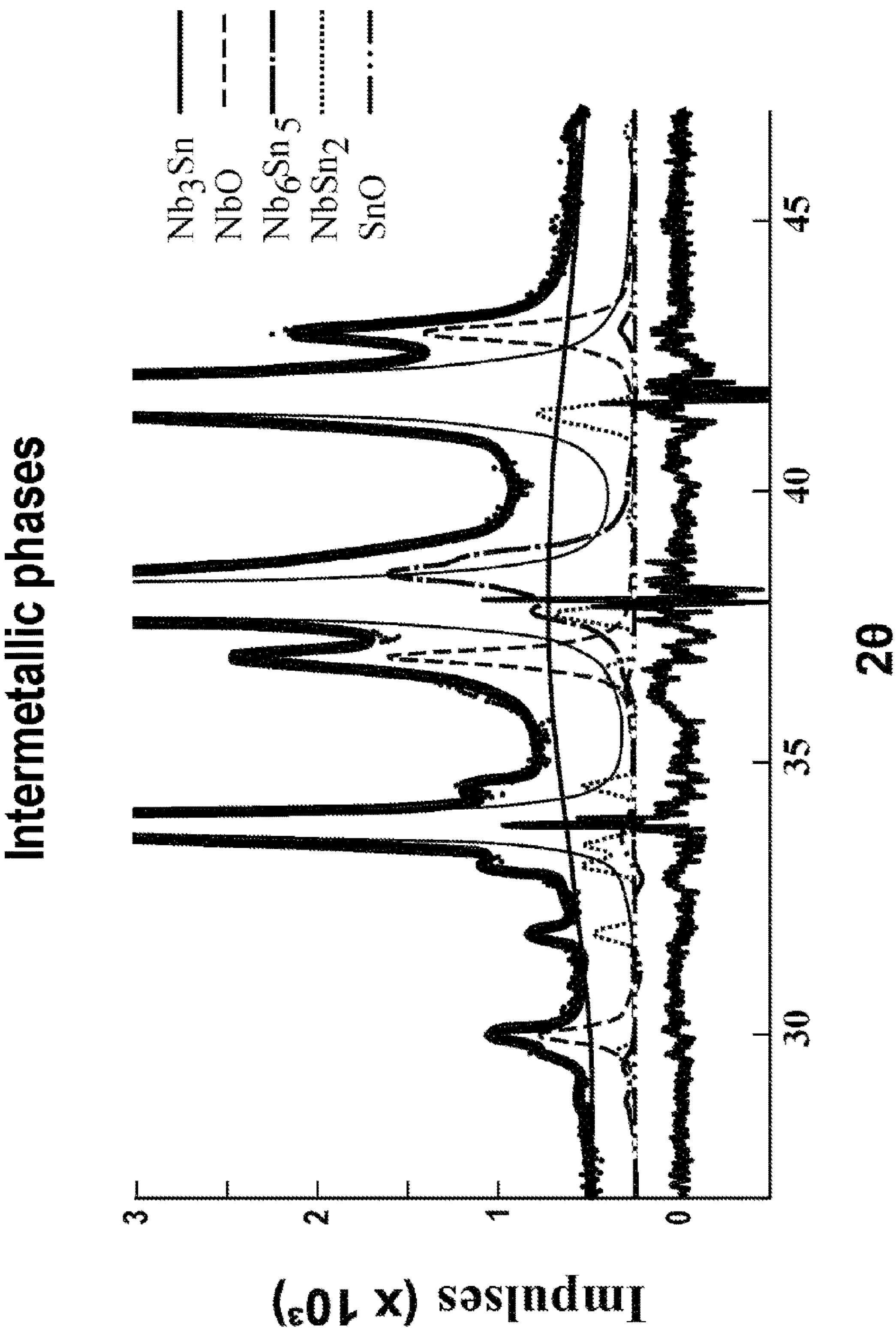
Fig.1 (Prior Art)
FIG. 1 shows an X-ray diffraction pattern of a conventional prior art $Nb_3Sn$.

Analyses of conventional powders as are provided by the prior art show that these prior art powders have a separate NbO phase which shows up as reflections in the X-ray diffraction pattern, as can be seen from FIG. 1, which shows a pattern of conventional $Nb_3Sn$ (cf. also M. Lopez et al., "Synthesis of nano intermetallic $Nb_3Sn$ by mechanical alloying and annealing at low temperature", *Journal of Alloys and Compounds* 612 (2014), 215-220). It has surprisingly been found that X-ray diffraction patterns of the powders of the present invention do not show such reflections, from which it can be concluded that these powders do not have separate NbO phases.

In an embodiment, the powders of the present invention are, for example, characterized by an oxygen content in the powder being less than 1.5% by weight, for example, less than 1.1% by weight, and, for example, from 0.2 to 0.75% by weight, based on the total weight of the powder. The oxygen content of the powder can, for example, be determined by means of carrier gas hot extraction (Leco TCH600).

Apart from a low oxygen content, the powder of the present invention also displays excellent phase purity, which is revealed, for example, by the powder having only a small proportion of crystalline phases of compounds other than the respective niobium-tin target compound. In an embodiment, the powder of the present invention is therefore characterized in that the compounds $Nb_3Sn$ and/or $Nb_6Sn_5$ and/or $NbSn_2$ can, for example, make up a proportion of, in each case, more than 92%, for example, more than 95%, for example, more than 98%, based on all crystallographic phases detected and determined by Rietveld analysis of an X-ray diffraction pattern of the powder of the present invention.

In an embodiment, the powders of the present invention can, for example, be characterized in that the powder comprises three-dimensional agglomerates having a size having a D90 of less than 400 μm, for example, from 220 to 400 μm, as determined by means of laser light scattering, the agglomerates being made up of primary particles which have an average particle diameter of less than 15 μm, for example, less than 8 μm, as determined by means of scanning electron microscopy, and the agglomerates have pores of which 90% or more have a diameter of from 0.2 to 15 μm, as determined by means of mercury porosimetry.

The D90 is the value which indicates the percentage of agglomerates in the powder which have a particle size of less than or equal to the size indicated.

In the production of superconducting wires, it has also been found to be advantageous to use powders having a small particle size. For this reason, preference is given to an embodiment of the powder of the present invention in which the powder has a particle size D99 of less than 15 μm, for example, less than 8 μm, for example, from 1 μm to 6 μm, as determined by means of laser light scattering. The D99 here is the value which indicates the proportion of particles in the powder which have a particle size of less than 15 μm. The particle size can be provided, for example, by milling the powders.

For the production of superconducting components by additive manufacturing processes, for example, LBM (laser beam melting), EBM (electron beam melting) and/or LC (laser cladding), it has been found to be advantageous to use powders having a particular spherical particle shape. It has here surprisingly been found that the powders of the present invention can very readily be atomized by known methods to provide powders having sphere-like particles, for example, using the EIGA (electrode induction-melting gas atomization) method. In an embodiment, at least 95% of all powder particles of the powder of the present invention can, for example, therefore have a Feret diameter of from 0.7 to 1, for example, from 0.8 to 1, after atomization, where the Feret diameter for the purposes of the present invention is defined as the smallest diameter divided by the greatest diameter of a particle, which is able to be determined by evaluation of SEM images.

The powder of the present invention can, for example, have a specific surface area as determined by the BET method of from 0.5 to 5 $m^2/g$, for example, from 1 to 3 $m^2/g$. The specific surface area as determined by the BET method can be determined in accordance with ASTM D3663.

To produce superconducting components having acceptable properties, it is indispensable for the chemical purity of the powders used to be high and for foreign substances to be introduced only in controlled form as dopants. Materials, in particular metallic impurities and fluoride-containing compounds, which are unintentionally introduced in the process should be minimized. In an embodiment, the powder of the present invention can, for example, have a fluorine content of less than 25 ppm, for example, less than 10 ppm, where the ppm are by mass. In an embodiment, the powder of the present invention can, for example, have a total content of unintentional metallic impurities with the exception of tantalum of less than 0.8% by weight, for example, less than 0.5% by weight, for example, less than 0.25% by weight, in each case based on the total weight of the powder.

In an embodiment, the powder of the present invention can, for example, additionally contains dopants. The addition of suitable dopants makes it possible to adapt the properties of the powder as required, and it has surprisingly been found that the dopants need not meet any particular requirements, but that it is rather possible to use customary dopants which are known to a person skilled in the art.

Some of the processes described in the prior art for producing superconducting wires based on $Nb_3Sn$ start from a tantalum-tin alloy or from an intermetallic tin alloy based on tantalum and niobium as a precursor powder. This has the disadvantage, however, that residues of tantalum remain in the later $Nb_3Sn$ wire filament and that the superconducting properties of the products can thereby be impaired. In the context of the present invention, it has surprisingly been found that the addition of tantalum can be dispensed with without the effectiveness of the reaction being adversely affected. In an embodiment, the powder of the present invention can, for example, therefore be essentially free of tantalum and tantalum compounds. In an embodiment, the proportion of tantalum and compounds in the powder of the present invention can, for example, be less than 1% by weight, for example, less than 0.5% by weight, for example, less than 0.1% by weight, in each case based on the total weight of the powder.

The powders of the present invention have a low oxygen content which is shown, for example, by no reflections for NbO and/or SnO being able to be detected in the X-ray diffraction pattern of the powders of the present invention. The present invention therefore further provides a process for producing the powders of the present invention, which process makes it possible to realize this property, where the process of the present invention comprises the reaction of niobium metal powder with tin metal powder and also a reduction step in the presence of a reducing agent, where the amount of the reducing agent added is based on the previously determined total content of oxygen in the two metal powders used. The reactant is selected from the group consisting of magnesium, calcium, $CaH_2$ and $MgH_2$, and mixtures thereof.

In an embodiment of the process of the present invention, the niobium metal powder can, for example, be reacted with tin metal powder in a first step and the product obtained is, for example, subsequently subjected to a reduction step in the presence of a reducing agent, where the amount of reducing agent added is based on the previously determined content of oxygen in the product obtained from the first reaction.

To make the process efficient, it has been found to be advantageous to carry out the reaction of the niobium metal powder with the tin metal powder directly in the presence of a reducing agent. In an embodiment of the process of the present invention, the reaction of the niobium metal powder with the tin metal powder can therefore, for example, be carried out in the presence of a reducing agent.

It has surprisingly been found that the formation of separate oxygen-containing phases such as NbO and SnO can be reduced further when the reaction of the metallic starting compounds is carried out in the presence of a gaseous reducing agent. The reactant is in particular one selected from the group consisting of magnesium, calcium, and mixtures thereof. It has surprisingly been found that the use of these reducing agents, especially in the gaseous state, enables the formation of NbO and SnO phases in the powder to be reduced, while the residues of the reducing agent can be removed simply from the product powder without leaving a residue.

The removal of the oxidized reducing agent can be effected in a simple way by washing. In an embodiment of the process of the present invention, the powder obtained can therefore, for example, be additionally subjected to a washing step. It has surprisingly been found that particularly efficient removal of any residues of the reducing agent can be achieved when mineral acids are used as washing liquid. In an embodiment of the process of the present invention, the washing step can therefore, for example, be a washing with mineral acids. The mineral acids can, for example, be selected from the group consisting of sulfuric acid, hydrochloric acid, and nitric acid.

As a result of the additional treatment with an amount of reducing agent based on the total content of oxygen in the process of the present invention, the restrictions in respect of the oxygen content of the starting materials used, as in the prior art, for example, as described in U.S. Pat. No. 7,459,030, no longer apply. Significantly higher oxygen contents are tolerable while achieving improved phase purity of the target compounds. The oxygen content should nevertheless not be too high. In an embodiment of the process of the present invention, a niobium metal powder containing less than 3% by weight of oxygen, for example, from 0.4 to 2.5% by weight, for example, from 0.5 to 1.5% by weight, and/or a tin metal powder containing less than 1.5% by weight, for example, from 0.4 to 1.4% by weight, of oxygen can, for example, be used, where the percentages are in each case based on the total weight of the powder.

It has surprisingly been found that the morphology of the niobium metal powders used is not subject to any limitations. It is possible to use powders comprising porous agglomerates which consist of three-dimensionally connected primary particles or powders consisting of irregular or spherical particles without porosity.

To prevent the formation of sparingly soluble $MgF_2$ and $CaF_2$ in the powder of the present invention, a niobium metal powder having a very low fluoride content can, for example, be used. Niobium metal powders produced by a reduction of niobium oxides are therefore preferred over niobium metal powders produced by reduction of fluorine-containing compounds, for example, $K_2NbF_7$. In an embodiment, the niobium metal powder used can, for example, contain less than 10 ppm of fluorine, for example, less than 5 ppm, for example, less than 2 ppm.

The powder of the present invention is particularly suitable for producing superconducting components. The present invention therefore further provides for the use of the powder of the present invention for producing superconducting components, in particular for producing superconducting wires. The superconducting component can, for example, be produced by powder-metallurgical processes or by additive manufacturing processes. In an embodiment, the superconducting wires can, for example, be produced by the PIT process.

The present invention further provides for the use of the powder of the present invention in additive manufacturing processes. The additive manufacturing processes can, for example, be LBM (laser beam melting), EBM (electron beam melting) and/or LC (laser cladding).

The present invention will be illustrated below with the aid of the following examples which should not be construed as constituting any restriction of the inventive concept.

EXAMPLES

Niobium metal powder was reacted with tin metal powder in the presence of magnesium as reducing agent under various conditions and the products obtained were washed with sulfuric acid and analyzed. Powders for which the reaction of the starting compounds was carried out conventionally without a reducing agent and a subsequent washing were employed as comparative examples. The tin metal powder used had a particle size of less than 150 μm and an oxygen content of 6800 ppm in all examples.

The results are summarized in Table 1, with the information on the oxygen contents being determined by means of carrier gas hot extraction (Leco TCH600) and the specific surface area being determined by the BET method (ASTM D3663, Tristar 3000, Micromeritics). The particle size was in each case determined by means of laser light scattering (MasterSizer S, dispersion in water and Daxad® 11, 5 min ultrasonic treatment). The trace analysis of the metallic impurities such as Mg was carried out by means of ICP-OES using the following analytical instruments PQ 9000 (Analytik Jena) or Ultima 2 (Horiba). X-ray diffraction was carried out on pulverulent samples using an instrument from Malvern-PANalytical (X'Pert-MPD with semiconductor detector, X-ray tubes Cu LFF with 40 KV/40 mA, Ni filter).

TABLE 1

| Experiment | Production | X-ray diffraction | Phase composition from Rietveld analysis | O content [% by weight] | BET [$m_2$/g] | Mg [ppm] | Particle size D90 [μm] | Particle size D99 [μm] |
|---|---|---|---|---|---|---|---|---|
| Comparative Example 1 | Nb + 2 Sn 790° C./2 h | Nb, $NbSn_2$, $Nb_3Sn$, NbO | Nb: 51% $NbSn_2$: 24% $Nb_3Sn$: 19% NbO: 6% | 1.29 | 0.3 | <300 | 77 | 98 |
| Ex. 1 | Nb + 2 Sn + Mg 790° C./18 h | $NbSn_2$, Nb | $NbSn_2$: 96% NbO: 4% | 0.51 | 0.46 | <300 | 54 | 79 |
| Ex. 2 | Nb + 2 Sn + Mg 790° C./2 h | $NbSn_2$ $Nb_6Sn_5$ | $NbSn_2$: 98% $Nb_6Sn_5$: 2% | 0.75 | 1.9 | <300 | 267 | 320 |
| Comparative Example 2 | 3 Nb + Sn 1050° C./6 h | $Nb_3Sn$, NbO, Nb, $NbSn_2$ | $Nb_3Sn$: 92% NbO: 3% Nb: 4% $NbSn_2$ 1% | 1.42 | 0.25 | <300 | 65 | 85 |
| Ex. 3 | 3 Nb + Sn + Mg 1050° C./6 h | $Nb_3Sn$ | $Nb_3Sn$: 100% | 0.23 | 0.55 | <300 | 76 | 88 |
| Ex. 4 | 3 Nb + Sn + Mg 1050° C./6 h | $Nb_3Sn$ | $Nb_3Sn$: 100% | 0.54 | 1.2 | <300 | 239 | 287 |

The niobium metal powder used for producing the powders of Examples 2 and 4 was obtained by a method analogous to the production process described in WO 00/67936 by reaction of $NbO_2$ with magnesium vapor. The niobium metal powder obtained had an oxygen content of 8500 ppm, a hydrogen content of 230 ppm, a fluoride content of 2 ppm, and an agglomerate size D50 of 205 μm and D90 of 290 μm. The average size of the primary particles was 0.6 μm, and the pore size distribution of the agglomerates was bimodal with maxima at 0.5 and 3 μm. Such niobium metal powders display a high porosity which, contrary to expectations, does not lead to a higher oxygen content and formation of an NbO and SnO phase in the NbSn powder. Niobium metal powders having a high porosity can accordingly also be used in the process of the present invention.

In the case of the powders of Examples 1 and 3 and of the two Comparative Examples, niobium metal powders according to the prior art without internal porosity of the particles were used, with these having an oxygen content of 2900 ppm, a hydrogen content of 10 ppm, and a particle size having a D90 of 95 μm. Examples 1 and 3 show that a low oxygen content and the avoidance of the NbO and SnO phases can also be achieved using these starting materials.

The powder of Example 2 was subsequently milled in an oxygen-free atmosphere, leading to a D90 of 3.1 μm and a D99 of 4.9 μm. It was surprisingly observed that, contrary to expectations, the milling of the powder did not lead to an increase in the oxygen content, which was 0.78% by weight in the milled powder, nor to formation of an NbO and SnO phase.

It was also surprisingly found that reaction of metals in the presence of magnesium did not lead to residues of the reducing agent remaining in the product. It was rather found that the content of Mg in the powder according to the present invention is in the normal range.

Figure 2:
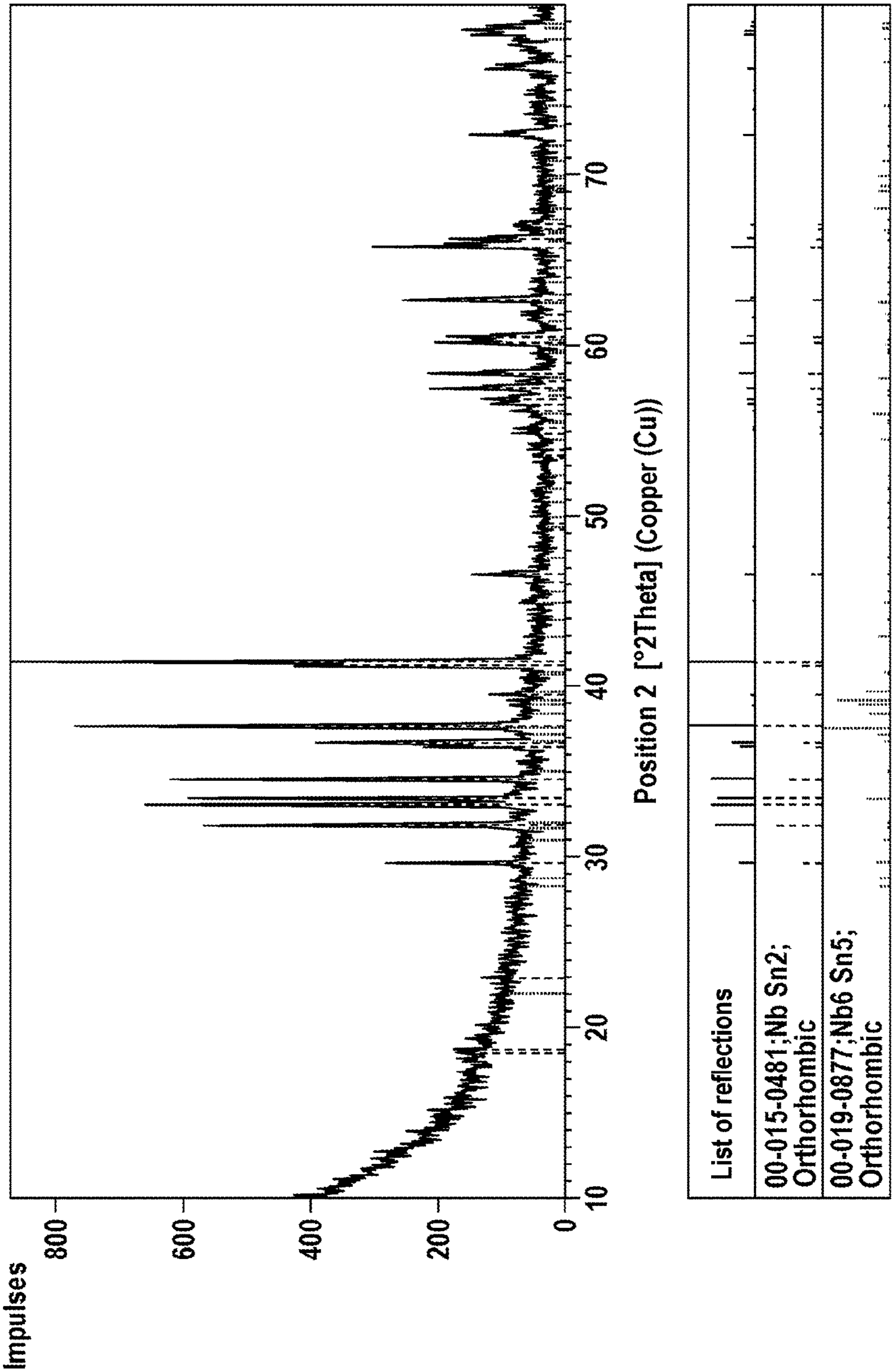
FIG. 2 shows an X-ray diffraction pattern of the $NbSn_2$ powder obtained in Example 2 according to the present invention.
Figure 3:
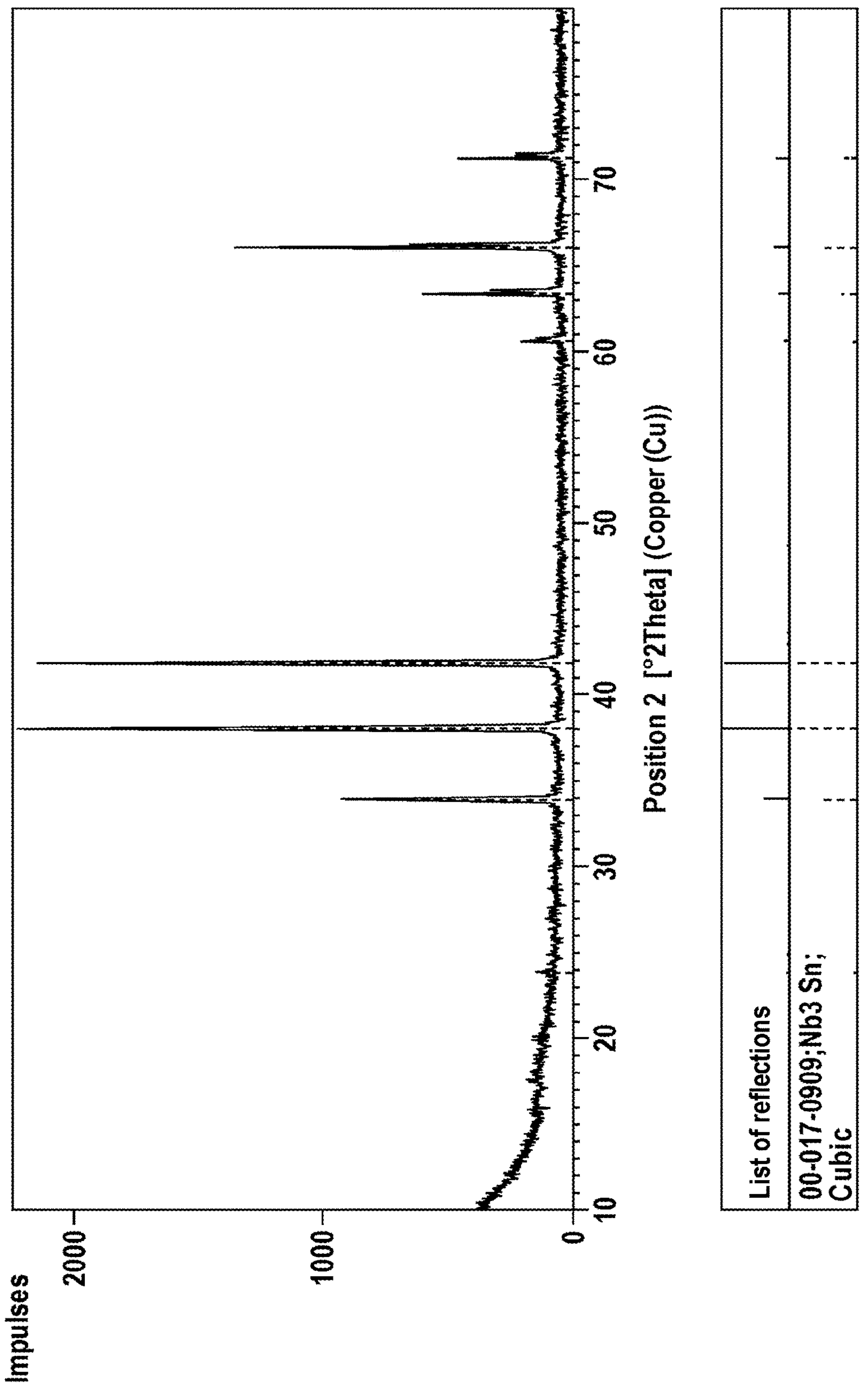
FIG. 3 shows an X-ray diffraction pattern of the $Nb_3Sn$ powder obtained in Example 4 according to the present invention.
Figure 4:
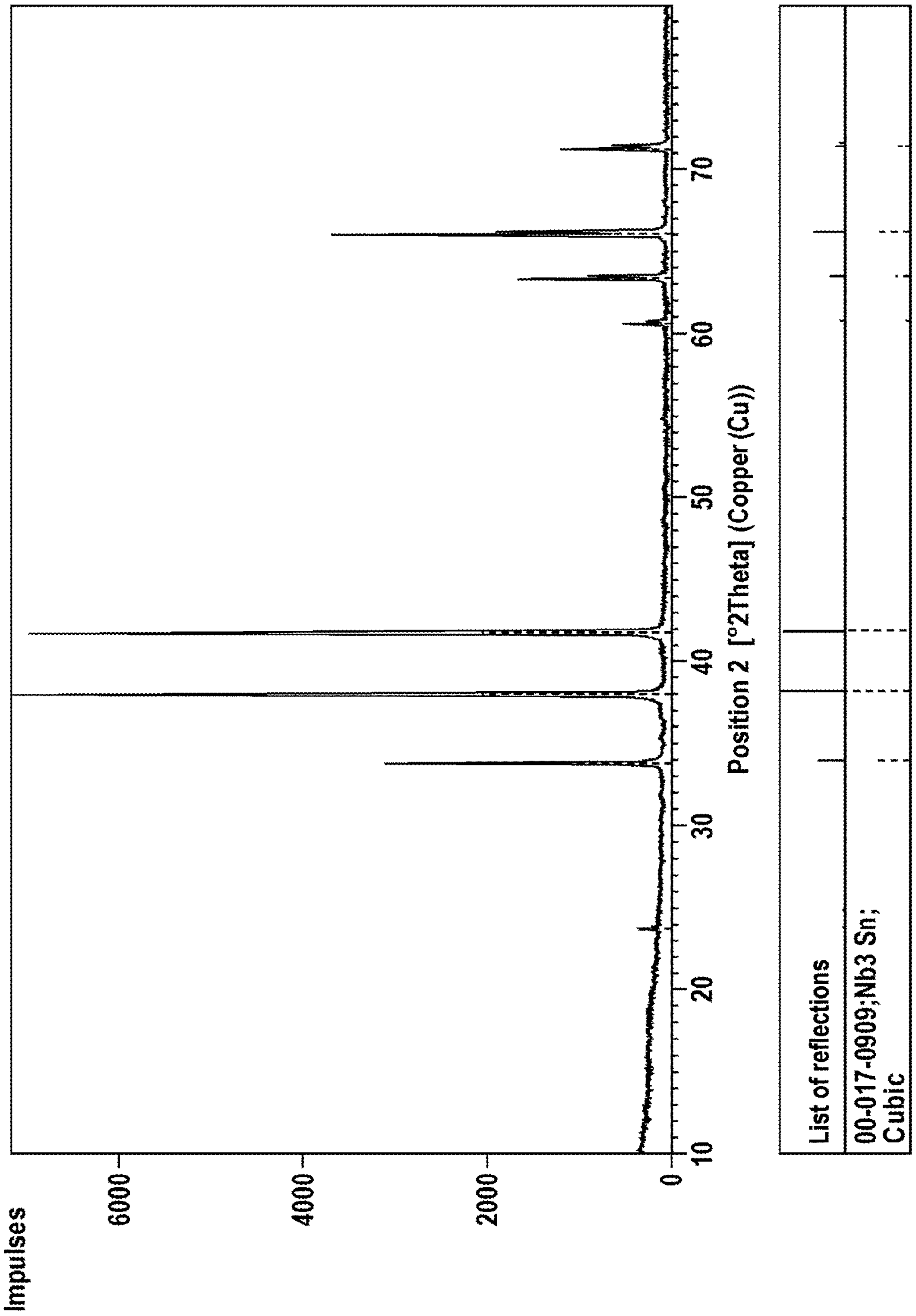
FIG. 4 shows an X-ray diffraction pattern of the $Nb_3Sn$ powder obtained in Example 3 according to the present invention.

FIGS. 2 to 4 show X-ray diffraction patterns of the powders according to the present invention, with FIG. 2 showing the $NbSn_2$ obtained in Example 2, FIG. 3 showing the $Nb_3Sn$ obtained in Example 4, and FIG. 4 showing the $Nb_3Sn$ obtained in Example 3. It can clearly be seen therefrom that the powders according to the present invention do not have any separate NbO phases. FIG. 1 shows the X-ray diffraction pattern of a powder as per the prior art, as is described by way of example by M. Lopez et al., ("Synthesis of nano intermetallic $Nb_3Sn$ by mechanical alloying and annealing at low temperature", *Journal of Alloys and Compounds* 612 (2014), 215-220), in which the occurrence of separate NbO and SnO phases can clearly be seen.

The present invention is not limited to embodiments described herein; reference should be had to the appended claims.

What is claimed is:

1. A powder for producing a superconducting component, the powder comprising:
at least one of $NbSn_2$ and $Nb_6Sn_5$,
wherein,
the powder does not comprise any separate NbO phases and/or SnO phases, and
the powder further comprises an oxygen content of less than 1.5% by weight, based on a total weight of the powder.

2. The powder as recited in claim 1, wherein the powder comprises a proportion of the $Nb_6Sn_5$ or the $NbSn_2$, respectively, of >92%, based on all crystallographic phases detected as determined via a Rietveld analysis of an X-ray powder diffraction pattern of the powder.

3. The powder as recited in claim 1, wherein the powder further comprises a particle size D99 of less than 15 μm, as determined via a laser light scattering.

4. The powder as recited in claim 1, wherein the powder further comprises a specific surface area as determined by a BET method of from 0.5 to 5 $m^2/g$.

5. The powder as recited in claim 1, wherein the powder further comprises:
powder particles,
wherein,
95% of all of the powder particles have a Feret diameter of from 0.7 to 1, the Feret diameter being a smallest diameter of a particle of the powder particles divided by a greatest diameter of the particle of the powder particles.

6. A process for producing the powder as recited in claim 1, the process comprising:
reacting a niobium metal powder with a tin metal powder; and
reducing in a presence of a reducing agent.

7. The process as recited in claim 6, wherein,
the reacting of the niobium metal powder with the tin metal powder is performed in a first step so as to provide a product, and
the product is reduced in the presence of the reducing agent in a second step.

8. The process as recited in claim 7, wherein at least one of,
the niobium metal powder comprises less than 3% by weight of oxygen, and
the tin metal powder comprises less than 1.5% by weight of oxygen,
in each case based on a total weight of the powder.

9. The process as recited in claim 6, wherein the reducing agent is a gaseous reducing agent.

10. The process as recited in claim 6, wherein the reducing agent is selected from the group consisting of magnesium, calcium, $CaH_2$, $MgH_2$, and mixtures thereof.

11. The process as recited in claim 6, wherein the process further comprises:
washing the product.

12. The process as recited in claim 11, wherein the washing of the product is performed with a mineral acid.

13. The process as recited in claim 12, wherein the mineral acid is selected from the group consisting of sulfuric acid, hydrochloric acid and nitric acid.

14. A method of using the powder as recited in claim 1 for producing a superconducting component, the method comprising:
providing the powder as recited in claim 1; and
using the powder to produce the superconducting component.

15. The method as recited in claim 14, wherein the superconducting component is a superconducting wire.

16. The use as recited in claim 14, wherein the superconducting component is produced by powder-metallurgical processes or by additive manufacturing processes.

17. A method of using the powder as recited in claim 1 in an additive manufacturing process, the method comprising:
providing the powder as recited in claim 1; and
using the powder in the additive manufacturing process, wherein,
the additive manufacturing process is selected from a laser beam melting, an electron beam melting, and a laser cladding.

* * * * *